Jan. 10, 1950 S. J. BEGUN ET AL 2,493,742
MAGNETIC TRANSDUCING CORE FOR MAGNETIC RECORD TRANSDUCERS
Filed July 30, 1946 7 Sheets-Sheet 1
FIG 1
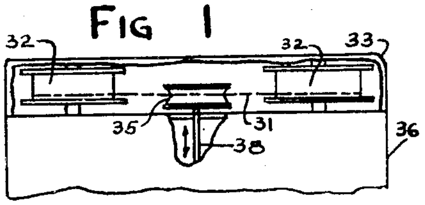
FIG 1-B
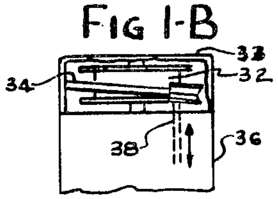
FIG 1-A
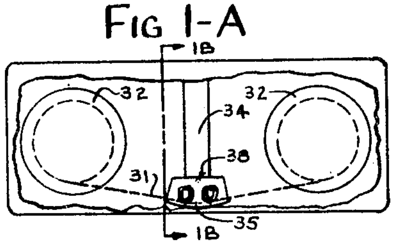
FIG 2
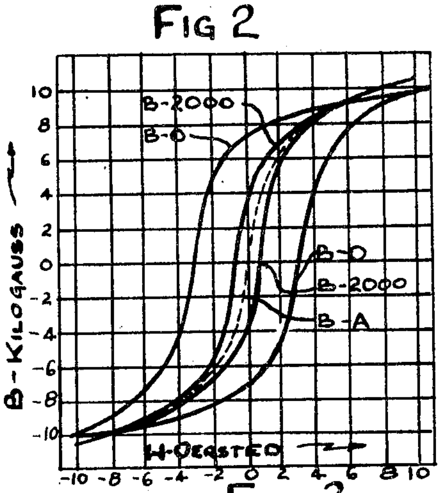
FIG 3
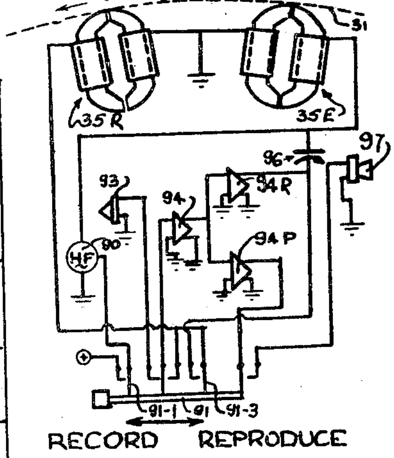
FIG 2-A
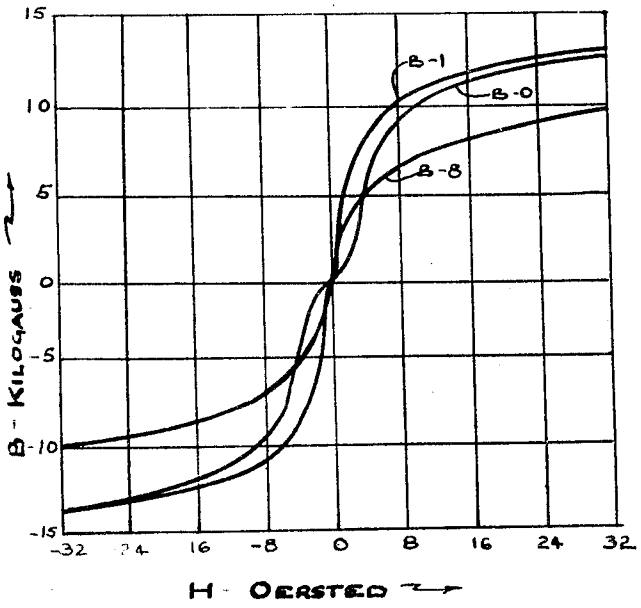
INVENTORS
SEMI JOSEPH BEGUN,
MARVIN D. TEMPLE.
BY
Pinelle & Drane
ATTORNEYS Jan. 10, 1950

S. J. BEGUN ET AL

MAGNETIC TRANSDUCING CORE FOR MAGNETIC RECORD TRANSDUCERS 2,493,742

Filed July 30, 1946

7 Sheets-Sheet 2

INVENTORS.
SEMI JOSEPH BEGUN,
MARVIN D. TEMPLE.

BY Pineles & Greene
Attorneys

Fig. 5
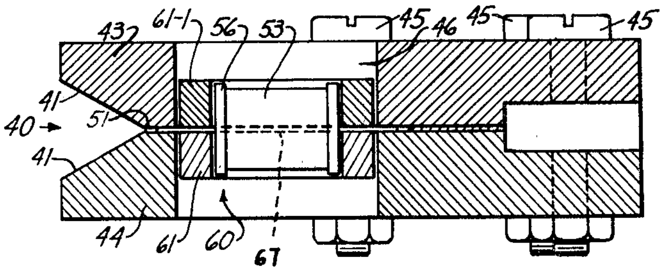
Fig. 5-A
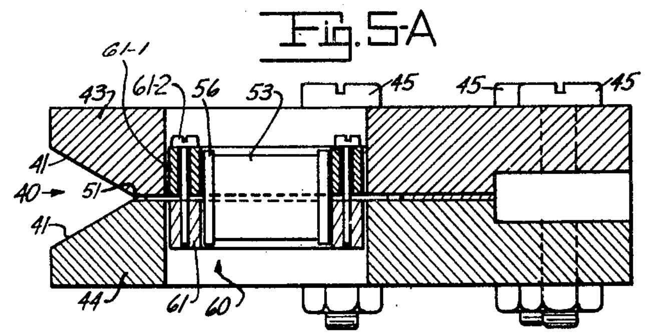
Fig. 11 Fig. 12
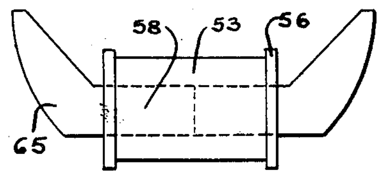
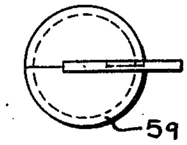
INVENTORS
SEMI JOSEPH BEGUN,
MARVIN D. TEMPLE.
BY Pirelles & Greene
attorneys Jan. 10, 1950

S. J. BEGUN ET AL

MAGNETIC TRANSDUCING CORE FOR MAGNETIC RECORD TRANSDUCERS 2,493,742

Filed July 30, 1946

7 Sheets-Sheet 4

INVENTORS.
SEMI JOSEPH BEGUN,
MARVIN D. TEMPLE.

BY Pineles & Greene

ATTORNEYS.

INVENTORS.
SEMI JOSEPH BEGUN,
MARVIN D. TEMPLE.
BY Pincles & Greene
ATTORNEYS.

Jan. 10, 1950

S. J. BEGUN ET AL
MAGNETIC TRANSDUCING CORE FOR
MAGNETIC RECORD TRANSDUCERS 2,493,742

Filed July 30, 1946

7 Sheets-Sheet 6

INVENTORS
SEMI JOSEPH BEGUN,
MARVIN D. TEMPLE.
BY Pineles & Greene
ATTORNEYS

INVENTORS.
SEMI JOSEPH BEGUN,
MARVIN D. TEMPLE.
BY Pineles & Greene
ATTORNEYS.

Patented Jan. 10, 1950

2,493,742

UNITED STATES PATENT OFFICE 2,493,742

MAGNETIC TRANSDUCING CORE FOR MAGNETIC RECORD TRANSDUCERS

Semi Joseph Begun, Cleveland Heights, and Marvin D. Temple, Cleveland, Ohio, assignors to The Brush Development Company, Cleveland, Ohio, a corporation of Ohio Application July 30, 1946, Serial No. 687,046
In Great Britain August 22, 1945

8 Claims. (Cl. 179—100.2)

This invention relates to magnetic recording and reproducing and it has among its objects improved magnetic transducer head arrangements which make it possible to magnetically record or reproduce signals by means of a moving magnetic signal-carrier filament, such as a magnetic wire with substantially uniform reponse and level characteristics, without requiring special laborious adjustments of the individual transducer heads.

The foregoing and other objects of the invention will be best understood from the following description of exemplifications thereof, reference being had to the accompanying drawings wherein Fig. 1 is a diagrammatic side view of a magnetic wire recording device with parts broken away;

Fig. 1–A is a similar top view of the device shown in Fig. 1;

Fig. 1–B is a cross-sectional view along line 1–B—1–B of the device shown in Fig. 1;

Figs. 2 and 2–A are explanatory curve diagrams showing the effect of superposed alternating current on the hysteresis loop and magnetization curves, respectively, of magnetic material;

Fig. 3 illustrates in diagrammatic form one method of operating the recording apparatus of the invention using A. C. bias;

Fig. 5 is a cross-sectional view along line 5—5 of the transducer head of Fig. 4;

Figure 4:
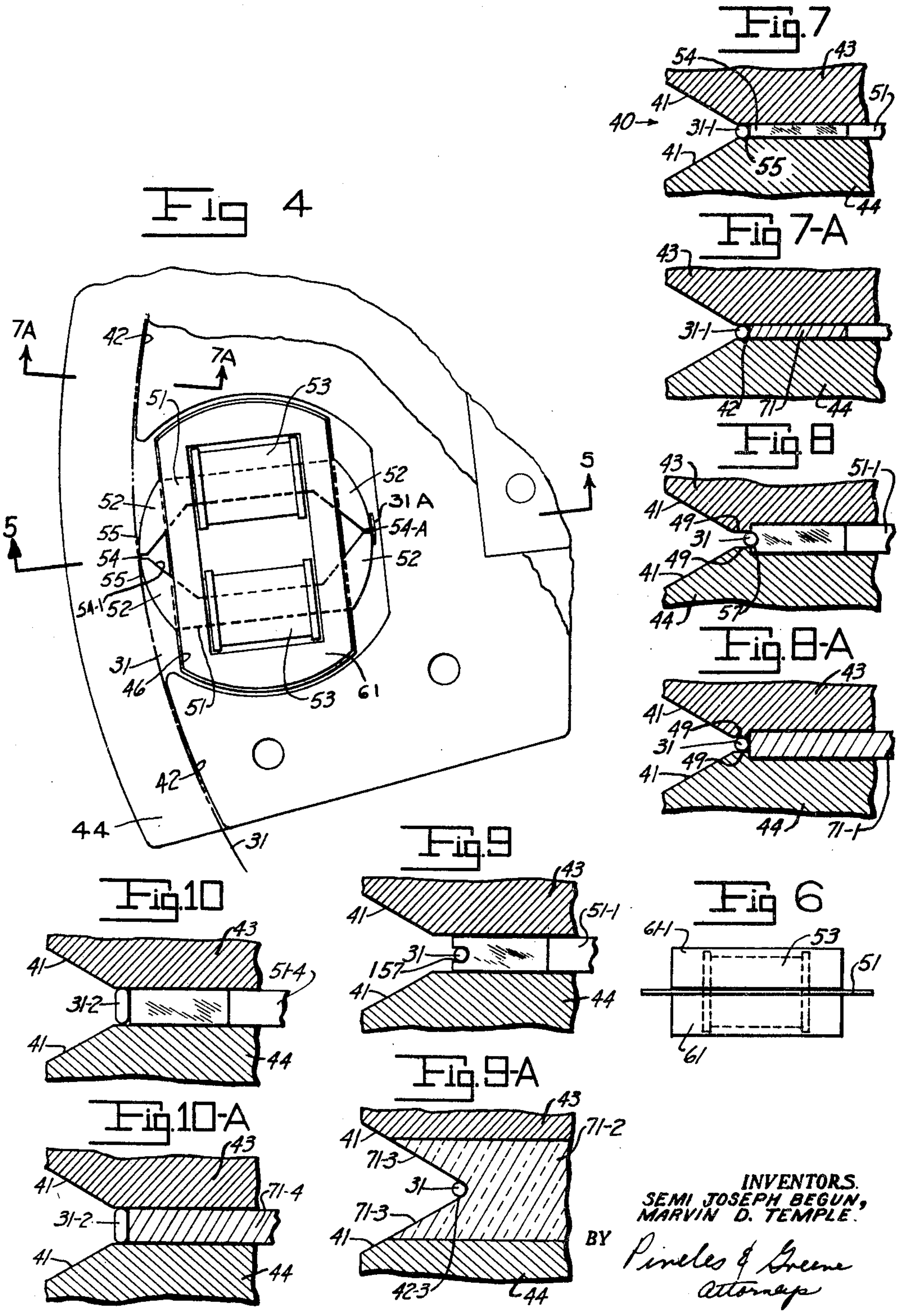
Fig. 4 is a top view of a magnetic transducer head with the top wall removed.
Figure 13:
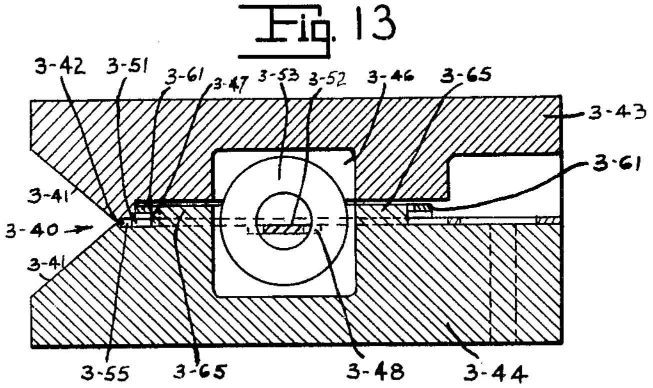
Figure 14:
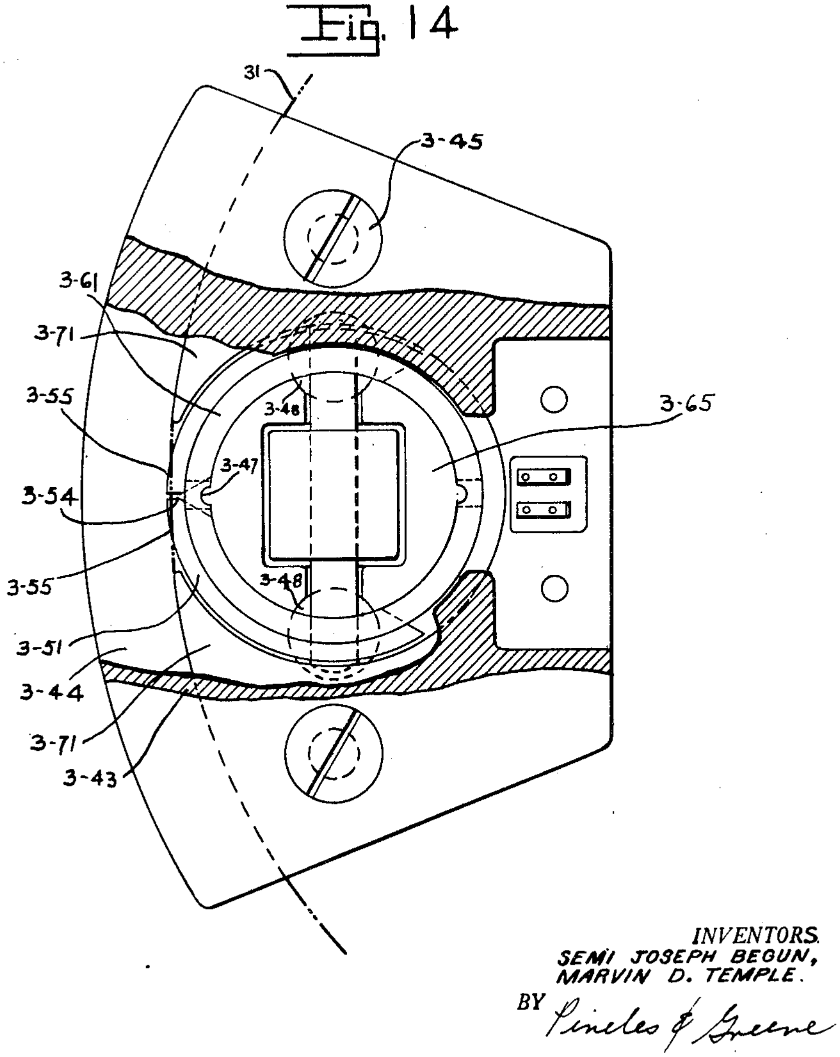
Figure 15:
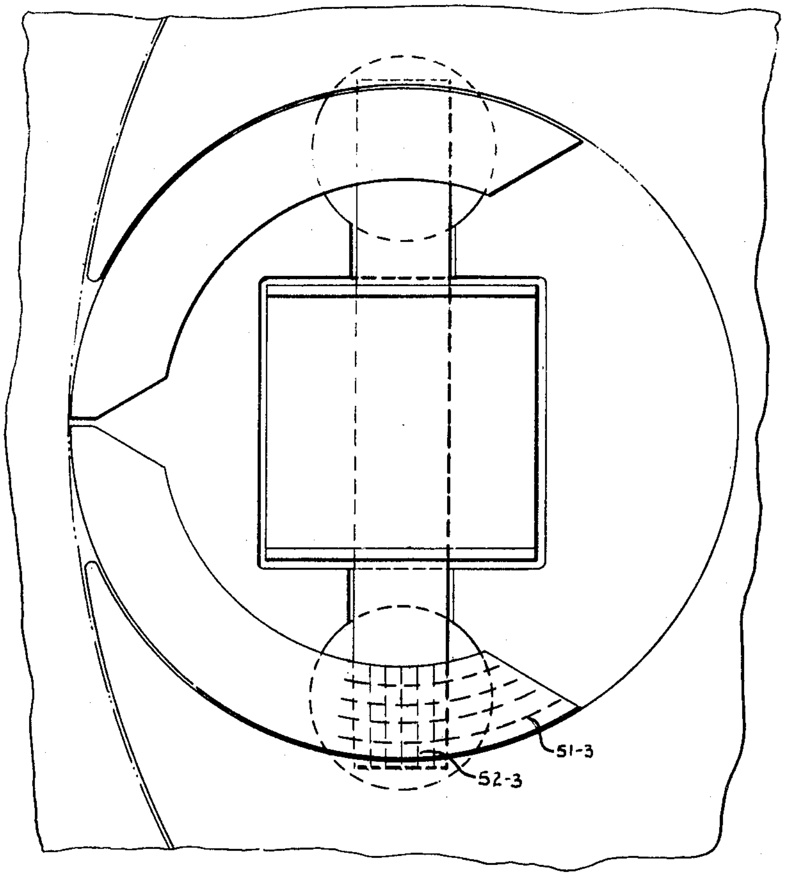
Figure 16:
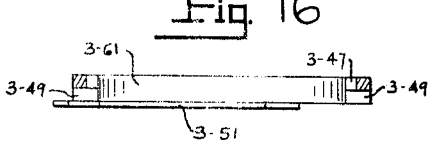

Fig. 5–A is a view similar to Fig. 1 of a modified constructional form;

Fig. 6 is a side elevational view of the double-pole-piece unit of the transducer head of Fig. 4;

Fig. 7 is a cross-sectional view similar to Fig. 5 of the pole face region of the double-pole-piece unit of the transducer head of Figs. 4 and 5;

Fig. 7–A is a cross-sectional view of the guide channel element of the transducer head along line 7–A—7–A of Fig. 4;

Figs. 8 and 8–A are views similar to Figs. 7 and 7–A of a modified construction;

Figs. 9 and 9–A are views similar to Figs. 7 and 7–A of another modified construction;

Figs. 10 and 10–A are view similar to Figs. 7 and 7–A of a further modified construction;

Figs. 11 and 12 are top and side view, respectively, of pole piece units;

Figs. 13 and 14 are view similar to Figs. 5 and 4 of a modified form of magnetic head exemplifying the invention;

Fig. 15 is a view similar to Fig. 14 with some of the upper members removed;

Fig. 16 is a cross-sectional view of the double-pole-piece unit of Figs. 13 and 14.

Figure 17:
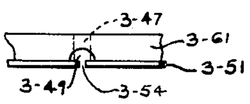
Figure 18:
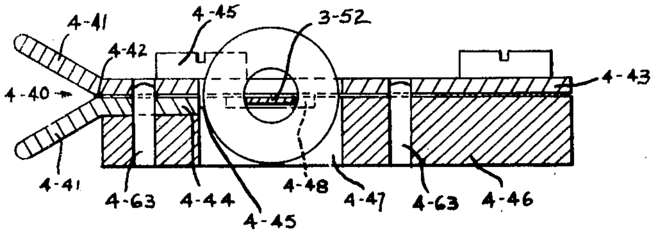
Figure 19:
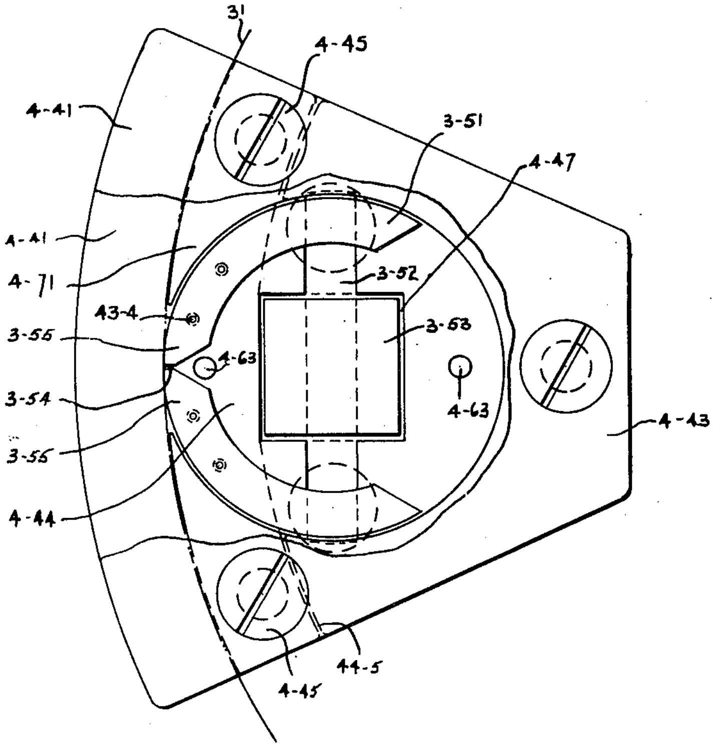
Figure 20:
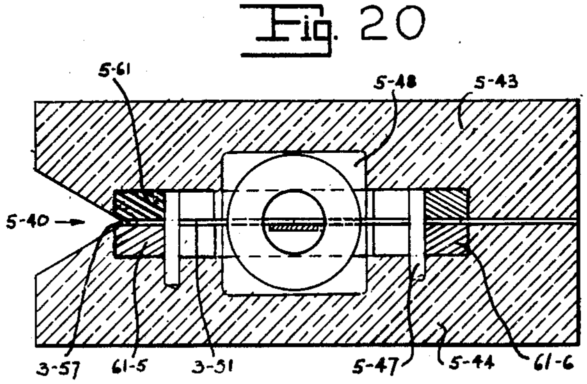
Figure 21:
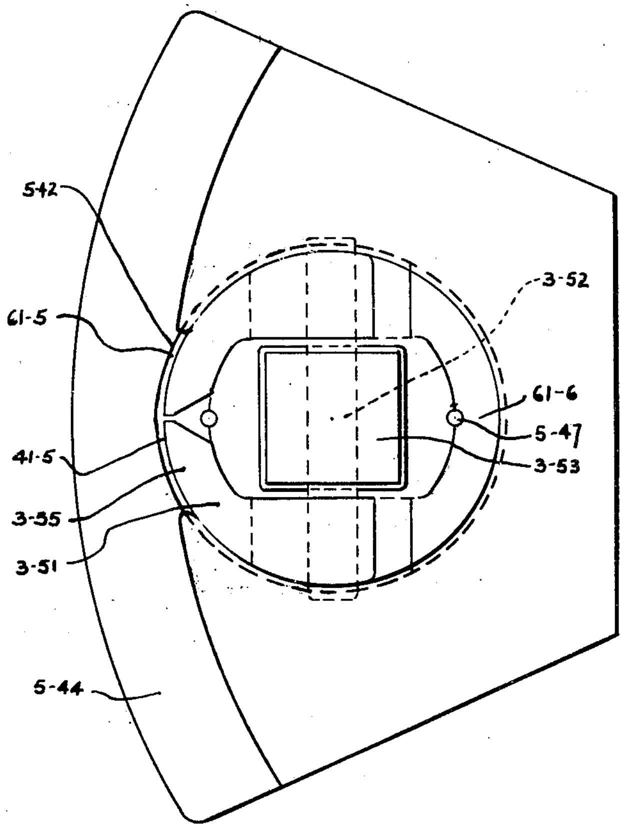

Fig. 17 is a front view of a portion of the double-pole-piece unit shown in Fig. 16;

Figs. 18 and 19 are views similar to Figs. 13 and 14 illustrating another form of magnetic head of the type there shown; and Figs. 20 and 21 are views similar to Figs. 13 and 14 showing a still further form of magnetic head of the type there shown.

In Figs. 1, 1–A and 1–B is shown diagrammatically a magnetic recording and reproducing arrangement combined with a transducer head arrangement of the invention.

A long spirally-coiled magnetic signal recording track, in the form of a magnetic steel recording wire or filament 31, is stored on two reels 32 which are revolvably mounted in a self-supporting reel holder unit, shown in the form of a casing 33, so that by rotating one reel the wire will be wound thereon while it is being unwound from the other reel.

The recording wire 31 is maintained under tension and is guided through a magnetic transducer head 35 which is shown carried by a substantially rigid flat arm 34 having a rear end portion pivotally secured to a portion of the holder casing 33 so as to make it possible to impart to the magnetic head assembly 35 an up-and-down oscillatory or reciprocatory motion for distributing the recording wire 31 along the height of a reel 32 while it is being wound thereon from the other reel.

The holder casing 33 is arranged for detachable coupling to a motor unit 36 so that either one of the reels 32 may be selectively rotated for winding thereon the magnetic recording wire 31, while assuring that the wire 31 is always held under tension. The motor unit 36 has a cam, not shown, which rotates at a speed correlated to the rotary motion of the reels 32, and the cam imparts through a follower rod 38 the required up-and-down oscillatory motion to the transducer head assembly 35 which is held biased against the upwardly projecting end of the follower rod, as by a biasing spring forming part of the pivotal connection between arm 34 and the wall of the holder casing 33.

Various magnetic transducer head arrangements for magnetic recording and reproducing have been suggested in the past. The transducer head arrangement most commonly used in the past employed two magnetic pole pieces spaced by an extremely small magnetic gap and placed on the opposite sides of a moving signal carrier, such as a wire or tape, and windings interlinked with the pole pieces carried the electric signals to be recorded or picked up.

Such magnetic heads have, however, been superseded by so called ring-type magnetic transducer heads which use ring-like or closed circuit magnetic cores provided with a magnetic gap and placed with the gap tangentially on one side of the moving record track so as to magnetically interlink the transducer head windings surrounding the core with a moving element of the record track bridging the magnetic gap. The use of such magnetic heads for magnetically recording with magnetic tapes or wires is described in the two German A. E. G. Patents 617,796 issued in 1935 and 660,337, issued in 1938, and the desirable operating characteristics of such ring-type magnetic heads have been described in an article by H. Lubeck, published in "Akustische Zeitschrift" of November 1937, pp. 273–297.

It was also long known that in recording magnetic signals a better signal to noise ratio is obtained if, in lieu of a D. C. biasing current, a high frequency alternating biasing current is superposed on the recording current, as described, for instance, in the U. S. Patent 1,640,881 of Carlson et al.

The superiority of recording with A. C. biasing current is probably due to the phenomenon illustrated by the curves of Figs. 2 and 2–A. Fig. 2 illustrates the effect of superimposing high frequency alternating fields on the hysteresis loop of magnetic material. The loop B—0 in Fig. 2 is a hysteresis loop of a magnetic material obtained in the absence of superposed alternating current magnetization. Curve B—2000 is a hysteresis loop of the same magnetic material obtained when the magnetic material was subjected to an alternating magnetizing current which produced an alternating magnetic flux having an induction of 2000 Gauss. A further increase of the alternating magnetization results in the loop entirely collapsing into a line curve B—A shown in dash lines.

In Fig. 2–A are shown magnetization curves of magnetic material under superposed alternating fields. Curve B—0 is a magnetizing curve of the magnetic material obtained in the absence of a superposed alternating field, and this curve has a sharp knee in the region below and above zero. Curves B—1 and B—8 show the magnetization curves of the same material obtained while a smaller or larger alternating field was superposed on the material. These curves show that the apparent maximum permeability reaches a maximum, as indicated by curve B—1, as the alternating flux increases, and that further increase of the alternating flux results in a decrease of the permeability, as indicated by curve B—8.

Since magnetic recording is generally used for recording audible frequencies, the superposed alternating biasing field is so chosen that its frequency is above the audible range, such as about 20,000 cycles.

Fig. 3 illustrates in diagrammatic form one practical method of operating a magnetic recording system in accordance with the invention wherein A. C. biasing is used for recording. The recording medium 31 in moving from one reel to another is guided past the pole face region of an erasing head 35E and the pole face region of a recording and playback head 35R. Both heads may be mounted in the head assembly 35 and may be equipped with a channel or groove so as to assist in guiding the moving record track. A switch 91 having four poles and two positions is connected so that in the Record position (left-hand position as shown) one pole 91—1 connects a high frequency oscillator 90 with a source of power, indicated by the circled plus sign, another pole connects microphone 93 with the input side of amplifier 94, and a pole 91—3 connects the output side of the secondary recording amplifier 94R with the recording head. The high frequency currents are led to the erasing head directly, adjustable condenser 96 by-passing some of the high frequency currents to the amplifier output to provide the necessary high frequency A. C. bias to the signals being led to the recording head. The recording medium is subjected to a high frequency magnetic flux as it passes the pole-gap of head 35E. This flux is strong enough and has a frequency high enough to place the moving medium in a magnetically neutral condition. As the medium now magnetically neutral passes the pole gap 54 of the recording head 35R, it is exposed to a magnetic flux corresponding to the signal current with superimposed high frequency current and successive portions become permanently magnetized and exhibit a magnetic flux which varies along the medium in accordance with the signal current variation with time. To play back the recording, the medium is rewound and then unreeled in the same sequence over the recording and playback head 35R with the switch 91 in the Reproduce position. The high frequency source 90 and microphone 93 are disconnected, the head 35R is connected to the input of amplifier 94 the output of which is connected to the reproducing device 97 which can be a loudspeaker through an intermediate secondary playback amplifier 94P. The capacitor 96 is adjusted to present an impedance to the signal voltage sufficiently high to prevent the appearance of any appreciable signal flux in the erasing head 35E, although for the higher biasing frequency sufficient coupling is obtained.

The secondary amplifiers 94R and 94P may be used to control the recording and playback amplitudes of the different frequencies of the desired range of frequencies so as to obtain higher fidelity as more fully described in the copending application Serial No. 685,093 filed July 20, 1946, now abandoned, by Otto Kornei entitled Magnetic recording and reproducing.

The magnetic transducer head of the present invention is the outgrowth of the discovery that for recording with high frequency alternating current biasing flux, best results are obtained if a minimum of magnetic material is used in the magnetic circuit of such recording head.

The effectiveness of the magnetic recording and reproducing process depends on the cooperative maintenance of stable operating conditions between the diminutive magnetic gap region of the magnetic transducer head and the diminutive magnetic record track element bridging the gap. These conditions are extremely critical, and the difficulties encountered in their operation are greatly increased when the recording and reproducing process is carried on on a thin wire or filament, and particularly when the magnetic head is also utilized for distributing the wire as it is being transported from one reel to the other.

In all types of magnetic transducer heads, the short length of the moving signal carrier, which is magnetically interlinked with the transducer head core, may be designated as the effective magnetic slit and it differs somewhat from the actual magnetic gap extending between the tips of the pole pieces. The magnetic slit width which determines the effectiveness of the magnetic recording process depends on the magnetic field distribution in the region between the diminutive pole-piece gap and the record track element bridging the gap, and this field distribution is determined by the character of the contact conditions between the pole pieces and the moving magnetic record element in the region of the diminutive gap.

Because of these critical difficulties, prior magnetic-record transducer heads could not be manufactured in quantities in a manner that would make it possible to obtain with them uniform recording and reproducing characteristics without special adjustment of each individual head, depending on the various different individual deficiencies and difficulties exhibited by it when subjected to actual conditions of use. Each heretofore available magnetic transducer head required a great deal of adjustment before it would meet specific requirements, and the tolerances which had to be allowed to meet these requirements were rather great. For example, in prior magnetic transducer heads, it was difficult to obtain equally good high frequency response and in some cases a given transducer head would cut off for much lower frequencies than another transducer head of substantially identical construction, and the variations in the cutoff frequency were as much as 25% or even more.

A further important factor responsible for the critical difficulties encountered in the magnetic recording process is the fact that the transducer heads require pole pieces made of a metal having a high permeability or mu, the magnetic sheet material of the pole pieces being in most cases a special nickel-iron alloy. These alloys have to be properly annealed in order to give them their high mu characteristics. Any stresses imparted to such material after annealing will change its magnetic performance characteristics.

When the magnetic recording process is carried on with a wire, additional critical conditions are created by the fact that the wire, on moving over the pole pieces, wears into the relatively soft magnetic pole-piece material a groove. As a result, erratic magnetic conditions develop in the critical magnetic gap region of the pole pieces.

The magnetic transducer head arrangements of the invention, the novel features of which will be described hereinafter in connection with various exemplifications thereof, make is possible to manufacture magnetic transducer heads that are very effective in recording on wire, without requiring individual adjustment of each head, and such heads of the invention have proven effective in overcoming the various critical difficulties of the prior magnetic transducer heads.

The magnetic transducer head assembly 35, is shown in detail in Figs. 4 to 10–A and constitutes a substantially-rigid, generally-flat, blocklike guide structure provided on one elongated side with an elongated guide channel 40 having two outwardly tapering guide surfaces 41 extending from an elongated narrow channel track 42 forming the deepest region of the guide channel 40. The elongated narrow channel 42 has a width of the order of the thickness of the signal carrier filament 31 and is so designed as to serve as a positive elongated guide surface which engagingly supports and guides a substantial length of the filamentary recording track 31 as it moves through the transducer head.

In the arrangement shown, the blocklike guide structure of the transducer head 35 is formed by two wall members 43, 44 held suitably clamped to each other as by a plurality of screws 45 and holding therebetween an assembly of two thin flat pole pieces 51 and transducer windings shown formed of two coils 53 mounted on and interlinked with the magnetic core structure formed by the two pole pieces. The magnetic transducer head shown is intended for recording as well as for reproducing, and its thin flat pole pieces 51 are of highly permeable magnetic sheet material. The thickness of the pole pieces is of the order of the thickness of the wire filament 31. The two pole pieces 51 are held longitudinally aligned in a plane on the opposite sides of a narrow non-magnetic gap 54 of the order of .001 inch width, or less.

The outwardly facing edge surfaces of the pole pieces which border the gap 54 are convexly curved so as to constitute two elongated pole faces 55 arranged to be tangentially engaged by a portion of the magnetic recording wire filament 31 moving past the gap 54.

Since the magnetic material of the pole pieces is much softer than the material of steel wires of the type used as filamentary magnetic recording tracks, the motion of such recording wire on the softer magnetic pole piece material wears away the magnetic material of the pole pieces, and will, after a period of use, form in the pole faces 55 a groove 57, such as is shown in Fig. 8, which supports the wire 31 better than a flat pole-face surface. In making magnetic recording heads of the type shown, the central flat surface region of the elongated pole faces 55 is preshaped or pre-grooved for assuring that the moving wire filament is guided and worn in along the central region of the narrow pole face edge surfaces 55. When recording on a wire which is about .003 to .006 inch thick, the pole pieces may be made about twice the thickness of the wire, for instance, about .010 to .014 inch thick, and not over 20 mils thick.

In order to maintain uniform operating conditions for a long period of operation during which the pole face portion 55 of the pole pieces 51 are worn out, the narrow magnetic gap region 54 adjoining the pole faces 55 is made by substantially parallel facing edge portion of the pole piece ends so as to provide an outer parallel narrow gap region of substantially uniform magnetic reluctance which does not materially change even if the wire wears a deep groove in the pole face region 55 of the pole pieces 51 along which it moves.

Each of the two transducer winding coils 53 is wound on a block-like bobbin member 56, having a slit 67 in which the pole piece 51 is placed so that the bobbin body serves as a mechanically strong support for its associated pole piece 51.

In recording, the recording signal currents traversing the transducer coil 53 impress on the successive elements of the moving magnetic recording filament 31 bridging the recording gap 54 corresponding magnetizing forces which convert it into a succession of elemental magnets or magnet waves corresponding to the recorded signal currents. In reproducing, the coercive magneto-motive forces of the succession of magnetic record waves passing the pole piece gap 54 force through the core structure of the pole pieces 51 and its surrounding windings 53 corresponding magnetic flux waves which induce in the transducer windings 53 voltage waves corresponding to the recorded signals.

In the reproducing process, it is important to assure that the gap region 54 extending between the edges of the pole piece ends facing the gap 54 shall not shunt away the magnetic flux waves which are induced in the pole pieces by the successive magnetic wave elements of the record filament 31 moving past the gap 54. To this end, the edges of the pole portions are tapered along their inward region to provide a wide tapered gap region 54—1 having relatively a great reluctance compared to the magnetic path of the core structure which is interlinked with the transducer winding 53.

The two bobbin members 56 with the pole pieces 51 held therein are united to a common mounting member shown in the form of a ring 61 so as to constitute therewith a self-supporting detachably removable double pole-piece unit holding its pole pieces assembled in their proper operative relationship. This mounting may be effected by preferably using a thin layer of a cement having a high curing temperature, such as commercially available synthetic resin cements which may be cured and hardened at relatively high temperatures such as 200° C. under pressures of the order of six pounds per square inch. The mounting member 61 may be made of a suitable molded synthetic resin material which is stable against humidity and temperature changes, synthetic resin materials having one or more layers of fabric impregnated with a suitable resin being particularly suitable. The ring 61 may be made of brass or other metal and mounted by cementing, spotwelding or soldering the pole pieces 51 to the metal ring directly. An overlying ring 61—1 is also shown in Fig. 5–A as completing the double pole-piece unit. The ring 61—1 may be secured as indicated for mounting the ring 61 or by clamping the two rings together by means such as the screws 61—2 shown in Fig. 5–A. Both rings 61 and 61—1 may be metallic, it having been discovered that no appreciable eddy current losses take place so long as the metallic rings are kept far enough away from the non-magnetic gap.

The double pole-piece unit is arranged to be held between the wall members 43, 44 of the magnetic head structure 35 with the two aligned pole faces 55 exposed along an intermediate portion of the narrow channel track 42 in such manner as to expose the pole faces 55 into operative engagement with the elements of the record track filament 31 moving and guided along the narrow channel track 42. The outwardly tapered guide surfaces 41 of the guide channel structure 40 are so designed that a tensioned length of the signal carrier track 31 which is biased toward the channel structure 40 is automatically guided by the guide surfaces into positive guiding engagement with the long narrow channel track 42 forming the deepest part of the channel structure. The taper of the guide surfaces 41 is so designed and correlated to the shape of the narrow channel track 42 as to cause a thickened track element, such as a splice joining two ends of a wire forming the record track, to be lifted outwardly from the narrow channel track 42 and cause the splice to ride along the outward regions of the tapered deflecting surfaces 41 while moving through the transducer head. In addition, the taper of the guide surfaces 41 is so chosen that the guide surfaces present to a wire protrusion deflected thereby a support which prevents forces exerted by the tensioned moving wire 31 from wedging a wire protrusion within the narrow inward region of the guide channel 40.

As shown in Fig. 7–A, the bottom of the narrow guide channel track 42 is shown formed by the narrow edge surface of a sheet 71 of hard material, such as Phosphor bronze, which is held clamped between the two wall members 43, 44 so that the narrow edge surface of the sheet member 71 is exposed along the deepest region of the guide channel 40 and serves as the guide support of the narrow guide channel track 42. The sheet member 71 which provides the guide surface of the guide channel track is of substantially the same thickness as the sheet material of the pole pieces 51 and is held aligned with them between the two wall members 43, 44.

As indicated in Figs. 8 and 8–A which are enlarged transverse cross sections of the pole piece region and the guide track region of the transducer head of another embodiment of the invention, the thickness of the sheet material of the pole pieces 51—1 and of the guide sheet 71—1 is made of the order of twice the thickness of the cross-sectional width of the recording track 31 and the facing sides of the two rigid wall members 43, 44 which hold them in their operative position, are provided with wall protrusions overlapping the edges 55 of the pole pieces 51 and the guide sheet 71—1 so as to form a channel 49 to guide the narrow magnetic record track filament 31 along the central region of the narrow edge surface of the pole pieces 51—1 and the guide sheet 71—1. The wall portions 49, 49, may be omitted as shown in Fig. 9 and the groove in the pole faces deepened as indicated by 157 to assist in guiding the wire. The guiding insert 71 may also be made wider, as shown in Fig. 9–A by member 71—2, the guiding face of 71—2 being then shaped to form a guiding groove 71—3.

In the transducer head arrangement shown in Figs. 4 to 12, the coil bobbin structure 56 of each of the pole pieces 51 is utilized to form a firm support for its thin pole pieces. This is particularly important if highly permeable magnetic material, such as Permalloy or Mumetal, is used for the core structure of the pole pieces.

The slit 67 in each bobbin 56 may be made large enough to admit the entire pole piece 51. With the pole piece construction illustrated, however, difficulties may arise if the pole piece is to be inserted after winding the coil 53 on the bobbin. The bobbin, according to a modified construction, may have a slit only wide enough to admit the straight shank portion 58. Fig. 11 illustrates such a construction in which the pole piece is made in two equal half-units 65 which are inserted into the slit from opposite ends, either before or after winding the coil. A smaller closely fitting slit makes for a bobbin of increased strength having a greater support for the pole pieces. The two pole piece half-units forming the gap 54—A may, if desired, be replaced by a single U-shaped unit in which case the slits 67 should be slightly wider than the shanks to permit adjustment of the gap 54.

Instead of making the bobbin structure 56 of one piece, it may be made of two halves with a pole piece recess on an inwardly facing side of the two bobbin halves, and they may be united to each other around the pole piece 51 so as to form a spool-like structure around which the coil may be wound. There are available a number of synthetic resin materials which do not undergo material dimensional variations under changing temperature and humidity conditions, and such moldable synthetic resin materials may be used for molding bobbin members 56.

Both spool halves may be made of the same shape and the two matching halves may be cemented to each other on the opposite sides of the pole pieces, a flat recess between the facing wall surfaces of the two spool halves providing the elongated space within which the flat pole piece is firmly retained and protected. Either or both bobbin sections may be made of a non-magnetic metal, the eddy current loss being kept low when the metal section or sections are sufficiently shorter than the pole piece. Fig. 12 shows such a construction wherein the lower bobbin section 59 is metallic.

There are commercially available various synthetic resin cements which may be cured and hardened at relatively high temperatures, such as 200° C. under pressures of the order of about six pounds per square inch. When two such bobbin half structures are united to opposite sides of the pole pieces held between them and to each other, by cementing in the manner described above for the ring mountings 61 or other appropriate means, they constitute a firm rigid pole piece bobbin unit which has a great degree of stability and which does not require any careful handling when winding thereon the coil or in assembling it, by mass production methods, into the transducer structure. The cementing is also very effective in providing an insulating layer between the pole piece and metallic portions joining it, such as one-half of the bobbin structure, for instance, the bobbin section 59 when made out of metal.

The two pole-piece bobbin units so united to the common mounting member 61 form a self-supporting double pole-piece unit which maintains all critical elements of the transducer structure in their critically aligned stable operating conditions. The double pole-piece unit is arranged to be held within the substantially rigid supporting structure shown formed by two wall members 43, 44 having in their interior a cavity space 46 within which the assembled double pole-piece bobbin unit is firmly held in its operative position so as to expose the pole faces 55 adjoining the operative gap 54 to portions of the magnetic recording track as it moves over the channel track 42 in the manner indicated in Fig. 4.

It should be noted that the cross section of the magnetic recording filament 31 may be made not circular as in ordinary wires, but may have a flat tape-like form, in the manner shown in Figs. 10 and 10–A and disclosed in the application of A. L. W. Williams and S. J. Begun, Serial No. 546,808, filed July 27, 1944. It has been found that magnetic heads of the invention of the type described herein are very effective in recording or reproducing signals with magnetic recording filaments of either round or flat cross section.

The coil windings 53 of the two pole pieces 51 are connected so that when recording signal current is sent therethrough for recording the signals, the pole faces 55 will impress or focus in successive longitudinal elements of the recording filament 31 engaging their corresponding magnetic flux waves which form in the magnetic filament 31 a succession of elemental magnets or magnetic waves corresponding to the signal current. In the reproducing process, the coercive magneto-motive forces of the succession of elemental magnets or magnet waves represented by the filament 31, will, on passing along the pole faces, force through the pole pieces corresponding magnetic flux waves which induce in their surrounding windings voltages corresponding to the recorded signals which voltages are utilized for reproducing the original recorded signal. The magnetic head shown in Figs. 4 to 10–A is very effective in suppressing disturbing leakage fluxes and cross talk.

As shown in Figs. 4, 5, 8, 9 and 10, the end portions of the two pole pieces 51 bordering the gap region 54 project in front of the ring body 61 so that the exposed portions of the aligned pole pieces 51 bordering the gap region may be positively engaged and held in their proper operative position along the guide channel track 42 by the overlying parallel surface portions of the wall members 43, 44 extending inwardly from the channel track region 42 along which the pole faces 55 are exposed.

Contrary to expectations, it has been found that a magnetic record transducing head of the type described above using a balanced magnetic core structure operates very efficiently for recording with high frequency biasing currents notwithstanding the fact that the magnetic pole pieces are united by soldering to a common rigid metallic mounting member, such as the mounting member 61 shown in Figs. 4 and 5, and no difficulties are encountered due to eddy currents that are induced by magnetic stray fields induced by such high frequency biasing currents traversing the windings of the coils 53.

Furthermore, it has been found that a transducer head arrangement of the type described above in connection with Figs. 5 and 5–A is also very efficient in obliterating signals of a record track 31 moving past the pole piece region if the coils 53 are excited with a high frequency obliterating current of the proper magnitude.

As indicated in Fig. 3 two heads may be mounted on a head assembly 35, one head being used for erasing and the other for recording and playing back.

In order to obliterate with A. C. flux, the apparatus is so arranged as to produce an A. C. obliterating flux of such character that when a record track moves past the pole gap along the channel track 42 of the transducer head, each record track element passes through an A. C. obliterating field which is so distributed that the record track is first subjected to saturation and then subjected to a decaying alternating magnetic field which restores it to a neutral condition. The frequency of the obliterating current sent through the coil winding is so related to the speed of the record track 31 that the magnetic field produced in the pole gap extends along a path equal to a substantial number of wave lengths of the obliterating field.

Obliterating heads utilizing pole pieces 51 arranged in the manner described above in connection with Figs. 4 to 12 have been found very effective in obliterating records made on wires having a diameter of about six mils when using an obliterating current of a frequency of about 20,000 cycles per second.

The magnetic record transducing head described above embodies a number of important features. The length of the narrow track channels 42 extending on both sides of the aligned pole faces 55 is made sufficiently greater than the length of the pole faces 55 engaged by the moving filament 31, and their relative surface levels and shapes are so designed and correlated as to suppress vibrations of the filament element bridging the gap and the transmission of vibrations along the moving filament toward the filament element bridging the gap.

This arrangement assures that the magnetic recording filament, such as a magnetic steel wire, in moving from one reel to another, is led between the tapering guide surfaces 41 of the guide channel 40 into tangential engagement with the narrow channel 42 to assure that the short intermediate portion of a long positively guided and supported filament length 31, bridging the critical gap region 54 separating the pole faces 55 of the pole-piece structure, is maintained in a vibration-free condition, and that uniform magnetic conditions prevail in the magnetic slit region which focusses and concentrates the magnetic recording and reproducing flux interlinking the short filament element bridging the magnetic slit with the double pole-piece core structure.

The elongated pole-face edge-surface portions of the pole pieces 55, which form the two longitudinally-aligned pole faces 55 of the pole pieces 51 are pre-shaped so as to form therein elongated concave pole-face channels 57 and assure that the wire remains centered in the elongated central region of the narrow edge surface portions forming the pole faces 55. The walls of the guide structure to which the pole pieces are secured are made of a non-magnetic material which does not undergo material variations with changes in humidity and temperature for assuring that the critical magnetic material of the pole pieces 51 is not subjected to strains which impair or vary its magnetic characteristics.

A suitable synthetic resin material may be used for the guide channel structure. If the magnetic head is used for recording with direct-current bias, a non-magnetic metal of high electrical resistance, such a s chrome alloys, may be used for the guide channel structure.

The guide channel structure of the transducer head assembly 35 through which a substantial length of the wire filament 31 is positively guided towards and away from the pole faces 55, is so designed and arranged as to suppress any propagation of vibrations of the wire resulting from the unwinding and winding-on operations while the wire passes through the head.

The major area of the elongated channel 42 along which the wire is led towards and away from the magnetic pole faces 55 is formed of non-magnetic material and shaped so as not to introduce any disturbance into the magnetic signal stored in the magnetic signal-carrier filament 31.

Furthermore, the surface material of the channel 42 extending on both sides of the aligned pole-face portions 55 is of a sufficiently greater hardness than the material of the pole pieces 51 and their level is so positioned relatively to the level of the pole-faces 55 as to reduce the specific pressure exerted by the filament on the pole faces 55 and to keep it materially smaller than the specific pressure exerted by said filament on the adjoining portions of the record track channel 42.

It has been found in practice that very effective magnetic transducer heads of the invention, suitable for magnetic recording with A. A. biasing and obliterating current, may be made with flat pole pieces, each of which is formed of a single magnetic sheet lamination in the manner indicated in Fig. 4 and having a thickness of approximately the same order of magnitude as the thickness of the magnetic wire 31. The guide channel structure 40 of the transducer head is so designed that the pole faces 55 of the pole pieces are confined below the surfaces of the inward region of the tapering guide faces 41 of the guide channel structure and forms with the interior faces of members 43 and 44 a narrow signal-carrier guide channel which maintains the magnetic wire filament 31 in a uniform contact condition along the central region of the pole-face edge-surface portions 55 which have formed thereon a concave elongated groove for assuring that the wire is biased against the central region of the thin pole-face edge surfaces.

In order to assure that the two pole pieces are rigidly supported in their proper operative position with the required gap spacing within the transducer head, the two pole pieces are suitably secured and united to at least one rigid mounting member so that they constitute with such mounting member a substantially rigid self-supporting unitary rigid double-pole-piece structure.

One or both of the wall members 44, 43 of the guide channel structure, or a rigid part thereof, may be utilized as the rigid supporting body to which the two pole pieces are secured and united in their properly aligned position so as to constitute therewith a rigid self-supporting double-pole-piece unit. If the magnetic head is used for recording with D. C. biasing current, the two properly aligned pole pieces 51 may be united to a rigid non-magnetic metal member of high electrical resistance by soldering or by an electrical welding process. If a rigid non-metallic member is used as the supporting wall, the two properly aligned pole pieces 51 may be used thereto by a suitable cement. Alternatively, the two aligned pole pieces 51 may be clamped and united to a rigid support in their properly assembled aligned positions by clamping them between two rigid non-magnetic walls of high electrical resistance, as by means of thin non-magnetic screws, such as thin watchmaker screws joining the two walls and extending through a central region of the flat pole pieces. The pole pieces may have apertures which are aligned on these or other screws or on separate aligning pins.

In making a double-pole-piece structure by soldering the pole-piece elements to a rigid supporting structure in the manner described above, it is important to use a soldering material with a low fusion temperature in order to assure that the heating accompanying the soldering operation does not affect the magnetic characteristics of the pole-piece material. The initial pole-face channel should be formed on the two aligned pole faces after they are united to their rigid supporting structure, and the pole pieces have to be annealed before they are soldered to the support and before their aligned pole faces are subjected to the pole-face channel shaping operation which should be performed with low forces to assure that the magnetic pole-piece material is not subjected to disturbing strains.

Alternatively, the magnetic pole-piece elements may be secured to their supporting structure by an electric welding process and the metallic material of the supporting structure is so chosen that it may be subjected together with the magnetic pole pieces united thereto to the annealing process without in any way deleteriously affecting the magnetic characteristics of the pole pieces.

As shown in Figs. 4 and 5 ,the two stiff substantially rigid guide wall members 43, 44 which are held clamped to each other on the opposite sides of the pole pieces 51, serve as their operative mounting support and provide the guide channel structure with outwardly tapering guide surfaces 41 extending from the narrow inner channel 42 so as to guide therein a substantial length of the moving signal-carrier wire filament 31 and maintain stable contact engagement between the exposed narrow magnetic pole faces 55 separated by the narrow non-magnetic gap 54.

As explained above, the thickness of the pole pieces 51 is made somewhat larger than the thickness of the magnetic recording wire 31, and their thin pole-face portions 55 are provided with elongated pole-face channels 57 of a width just sufficient to hold embraced a portion of the wire moving across the gap and having the same character as a channel which the motion of the recording wire 31 would wear into the body of the pole faces 55 after a period of use.

The overall thickness of the pole-piece portions having the pole faces 55 is made large enough so as to provide on both sides of the pole-face channel 57 narrow wall portions of highly permeable magnetic material having a thickness required for maintaining the moving wire in a uniform magnetic condition with respect to the pole-face portions of the pole pieces. Thus, when using, for instance, a magnetic signal-carrier wire 31 which is six mils thick, very good and uniform operating results are obtained with pole pieces 51 made from a magnetically, highly-permeable sheet about .012 inch thick and containing in the pole faces 55 channels 57 .006 inch wide, so that the moving wire shall fit between the highly magnetic channel wall portions which are .003 inch thick.

In order to secure good efficiency in the reproducing process and maintain uniform operating conditions for a long period of operation during which the pole-face channels 57 may be deepened as a result of wear, the magnetic gap formed between the end-edge surfaces of the pole pieces 51 facing the gap has an outer parallel gap region 54 of substantially uniform magnetic reluctance, and an adjoining inner divergent gap region 54—1 of greatly increased magnetic reluctance. The inward distance of the parallel gap region 54 is made sufficient to permit the pole-face channel to wear in deeper without significantly changing the magnetic flux interlinkage conditions between the wire element 31 bridging the gap 54 and the adjacent pole-face portions 55.

This spacer layers of compressible, material, such as neoprene, may be placed on the inner surfaces of the wall members 43, 44 facing the cavity to permit the self-supporting double pole-piece assembly to assume its proper position within the cavity without subjecting the end portion of the pole pieces which is clamped between the two wall members to excessive strains.

By using a magnetic core structure and pole pieces of highly permeable magnetic sheet material having a thickness of the order of the thickness of the thin magnetic recording wire, such as from one-half to about four times the thickness of the wire, a magnetic transducer head of the type here described is very effective for magnetic recording with A. C. biasing and obliterating current, and the eddy-current losses in the magnetic material of the core structure are kept down to a practically negligible level suitable for general practical use. Such magnetic head construction is also very effective for magnetic recording on wire with D. C. biasing and obliterating current.

The wall material of the guide surfaces 41 should be of a character which exhibits great wear-resistance and toughness. Ceramic as well as various commercially-available, non-magnetic, electrically-insulating, molded synthetic materials, such as molded phenolic condensation products, have the wear-resistance and toughness required for this purpose.

When used for recording with D. C. biasing current, the guide surface members may be made of metal, and the guide surfaces 41 may be provided with a hardened guide surface layer, for instance, by alloying the surface of the metal with a layer of hard wear-resisting material, such as chromium, which withstands wear when it is traversed by a steel wire protrusion. Alternatively, the hardened surface layer may be formed on the guide surfaces of the guide members by a plating process. The exposed pole faces 55 of the pole pieces 51 may be likewise provided with a surface layer of hard wear-resisting material formed thereon by a plating process.

The erasing head may be identical with the transducing head although the very high permeability core is not required for erasing. Silicon steel makes a magnetic core which provides excellent erasing. When recording with a head not used for playback, silicon steel also functions efficiently.

In Figs. 13 to 17 is shown another exemplification of a magnetic transducer head based on the principles of the invention. It has a magnetic core structure comprising two arcuate pole piece portions 3—51 and yoke member 3—52 having mounted thereon a transducer winding coil 3—53 so as to record or reproduce a magnetic signal in conjunction with a magnetic signal-carrier wire filament 31 moving tangentially along pole-face channels formed on the pole faces 3—55 separated by the magnetic gap 3—54.

The two pole portions 3—51 are united, as by welding or soldering, to a common, relatively-stiff mounting member shown in the form of a ring 3—61 of a width slightly less than the radial width of the arcuate pole pieces 3—51, so that the outer edge portions of the two pole pieces 3—51 slightly project beyond the outer circular surface of the mounting ring 3—61. The ring 3—61 may be of a non-magnetic, electrically-resistive metal, such as German silver, or brass.

The magnetic core parts 3—51, 3—52 and the transducer winding coil 3—53 are held in position in hollow space 3—46 provided between the inwardly facing clamping surfaces of two wall members 3—43, 3—44 of non-magnetic material, such as a molded synthetic resin which exhibits great strength and toughness.

One side of the two wall members 3—43, 3—44 has inwardly facing guide surface portions 3—41 tapering outwardly from the narrow pole faces 3—55 and forms the intermediate part of the guide channel structure 3—40 designed in the manner described in connection with structure 40 of Figs. 4 and 5. The inward face of the lower wall member 3—44 has upwardly projecting wall projection 3—65 of the outer surfaces which define portions of a cylinder and fit the inner circular rim of the pole-piece mounting ring 3—61 so that it may be placed thereon in the properly aligned position shown. An aligning notch 3—47 of the ring 3—61 fits over an aligning protrusion of the wall projection 3—65 to facilitate proper alignment of the double pole-piece ring 3—61 so that the pole faces 3—55 shall be exposed along the narrow guide channel track 3—42 of the guide channel structure 3—40 formed by the outwardly tapering guide wall portions 3—41 of the two wall members 3—43, 3—44, as in the arrangements described in connection with Figs. 4 and 5.

In addition, the inward face of the lower wall member 3—44 has formed therein two grooves 3—48 for holding in position the magnetic yoke member 3—52 with its coil 3—53 so that when the pole-piece ring 3—61 with its two pole pieces 3—51 are placed in aligned position around the aligning wall projections 3—65, the rear portion of each pole piece 3—51 will make a good magnetic circuit connection with the underlying portion of the yoke member 3—52 along their overlapping regions.

The inner side of the upper wall member 3—43 has a circular recess fitting around the circular rim of the pole-piece mounting ring 3—61 and arranged so that when the two wall members are clamped to each other, the inwardly-facing non-recessed flat surface of the wall member 3—43 will clamp the arcuate portions of the two pole pieces 3—51 projecting beyond the mounting ring 3—61 against the corresponding facing surface of the lower wall member 3—44 which engages the lower side of the two pole pieces 3—51.

The yoke member 3—52 with the transducer coil 3—53 are suitably retained, as by cementing, in their proper operative position within the lower wall member 3—44. The upper wall member 3—43 may be held clamped to the lower wall member 3—44 by two screws 3—45 engaging internally threaded bushings embedded in the lower wall member 3—44. With this arrangement, it is merely necessary to loosen the screws 3—45 and lift the upper wall member 3—43 from the position shown in Fig. 13, whereupon the double pole-piece unit formed by the mounting ring 3—61 and the two pole pieces 3—51 may be removed and replaced by another double pole-piece unit which is retained in its proper operative position by clamping thereover the upper cover wall 3—43 with the screws 3—45.

The transducer head of Figs. 13 to 17 has a guide channel structure 3—40 which provides on each side of the aligned pole-faces 3—55, additional filament guide-path elements extending in generally longintudinal alignment with the pole-face guide channels 3—57 and in guiding engagement with a substantial length of the moving filament 31 for performing the various cooperative functions explained above in connection with Fig. 4. The support surface of the narrow guide channel track 3—42 is formed by the edge surface of an inner guide sheet 3—71 which is clamped between the inwardly-facing surfaces of the two wall members 3—43, 3—44 surrounding the poleface mounting ring 3—61 with its two pole pieces 3—51.

As in the similar arrangement of Fig. 4, the guide sheet 3—71 is of non-magnetic material and has two forwardly extending arms with outwardly-facing edge surfaces which form the narrow channel 3—42 which guides two substantial lengths of the moving wire filament 31 on both sides of the pole-face 3—55, in the manner described above in connection with Fig. 4.

The thickness of two pole pieces 3—51 and of the inner guide sheet 3—71 is about twice the thickness of the recording wire filament 31. A narrow guide channel track of a width about equal to the thickness of the wire filament 31, is formed along the wider outer guide edge surfaces of the pole pieces 3—51 and of the arcuate arms of the guide sheet 3—71 by providing the inner regions of the tapered channel surfaces 3—41 with inward wall protrusions which overlap the surface edges of the pole faces 3—55 and of the sheet 3—71 so as to positively confine the moving wire filament 31 within the central region of these guide edge surfaces, in the manner indicated in Figs. 8 and 8–A.

The inner guide sheet 3—71 is made of substantially the same thickness as the pole pieces 3—51 so that its inner circular region may be clamped between the inwardly facing surfaces of the two wall members 3—43, 3—44 at the same level as the two pole pieces 3—51.

The self-contained double pole-piece units of the different forms of magnetic transducer heads shown, each formed of a rigid mounting member and two pole pieces united therewith, proved of great value in making it possible to build on a mass production basis magnetic transducer heads having uniform gaps and pole-face regions. The double pole-piece unit of the type described above in connection with Figs. 13 to 17 embodies special features which make it possible to manufacture such double pole-piece units on a mass production basis, with uniform highly satisfactory operating characteristics.

As shown in detail in Figs. 16 and 17, the mounting member 3—61 is provided not only with vertical aligning notches 3—47, but also with radial notches 3—49 located in the diametrically opposite portion of the ring 3—61 in the direction of the gap 3—54 between the pole pieces 3—51. The pole pieces 3—51 are united to the ring 3—61, as by soldering, in the position shown, while held aligned by their notches 3—47 in a suitable jig, so that the edges of the pole piece ends facing the narrow gap region 3—54 are in direct abutment and the gap is completely closed. After the two pole pieces 3—51 have been so united to their mounting ring 3—61, the ring 3—61 may be placed in a suitable expanding jig in which the inner circular surface of the ring 3—61 may be subjected to predetermined outwardly directed expanding forces which will bring about a definite, slight, permanent deformation of the ring in the region of the radial notch 3—49 overlying the gap region 3—54, the magnitude of the deformation imparted to the ring being readily so controllable as to spread apart the pole-tip ends of the pole pieces to the desired uniform small gap distance, such as .001 inch, with a very high degree of accuracy, while producing such double-pole-piece unit on a mass production basis.

If desired, the ring need not be spread since even though the pole portions 3—51 are in contact the thin film of oxides and absorbed gases as well as microscopic roughness always present insure a satisfactory magnetic spacing.

When recording with A. C. biasing current with magnetic transducer heads of the type shown in Figs. 13 to 17, eddy currents are induced in the regions of the magnetic core having relatively large surfaces extending more or less perpendicularly to the direction of the magnetic flux field, such as the regions where the flat end portions of the magnetic yoke member 3—52 overlap the end portions of the two pole pieces 3—51.

In accordance with the invention, such eddy currents are effectively reduced and their objectionable effect is suppressed by making the magnetic core areas, which extend perpendicular to the direction of an induced A. C. flux, in the form of subdivided area elements separated by electrical insulating gaps extending in directions perpendicular to the direction of the eddy-current voltages induced therein.

One form of such arrangement is indicated in

Fig. 15, in which the overlapping end portion of a pole piece 3—51 of the yoke member 3—52, are provided with very thin cuts 51—3, 52—3, respectively. The cuts 51—3, 52—3 are so formed as to act as electric insulating gaps extending in a direction transverse to the direction of the eddy-current voltages induced in the electrically-conducting magnetic material by A. C. fluxes induced in the core structure in a direction substantially perpendicular to the overlapping core sheet surfaces.

If desired, the channel portions of the members 3—43 and 3—44 may be arranged so as not to overlap the exposed edges of the pole portions or the guide 3—71. This arrangement may be used with pole portions about as thick or slightly thicker than the wire.

In Figs. 18 and 19 is shown another form of magnetic record transducing head of the type described in connection with Figs. 13 to 17, but designed for recording with D. C. biasing current. It has pole pieces 3—51, a yoke member 3—52 and a transducer winding coil 3—53 designed and arranged in the same manner as the similar element of Figs. 13 to 17.

As explained before, the effectiveness of the magnetic recording and reproducing process depends on the maintenance of stable operating conditions in the critical region in which a diminutive element of the magnetic recording medium, such as the wire, bridges the tiny gap 3—54 separating the pole pieces 3—51. In the magnetic head shown in Figs. 18 and 19, the two pole pieces 3—51 are maintained in their proper, critically-aligned operative position across the small gap 3—54 by uniting them to at least one substantially rigid mounting member. In the arrangement shown, the two pole pieces are held in their properly aligned position across the gap by uniting them either to the upper wall member 4—43 or to both wall members 4—43, 4—44, between which they are mounted.

The two wall members 4—43, 4—44 which serve as a support for the pole pieces 3—51, are also utilized to provide a guide channel formed by two wing-like wall portions 4—41 constituting an outwardly opening elongated guide channel structure 4—40 extending from an elongated narrow channel track 4—42 constituting the deep bottom region of the channel structure, as in the similar arrangements described above. The elongated narrow channel track 4—42 has a width of the order of the thickness of the wire filament 31 and is so designed as to serve as a positive elongated guide surface which engagingly supports and guides a substantial length of the recording wire 31 as it moves into tangential engagement toward and from the pole face regions 3—55 of the pole pieces 3—51.

The deepest support surface of the narrow channel track 4—42 of the guide channel 4—40 is formed by the edge surface of a sheet member 4—71 of hard material, such as phosphor bronze, having a thickness of the order of the thickness of the pole pieces 3—51 and held clamped between the two wall members 4—43, 4—44, aligned in the same plane as the pole pieces 3—51.

The wall members 4—43, 4—44 of the guide structure to which the pole pieces are secured may be made of non-magnetic material which does not undergo material changes under varying humidity and temperature conditions and which has a high electrical resistance. Suitable non-magnetic metal of high electrical resistance may be used for the wall members 4—43, 4—44 if the magnetic head is designed for recording with D. C. biasing current. In order to assure that the two pole pieces 3—51 are rigidly supported in their properly operative position, they are suitably secured and united to at least one of the wall members 4—43, 4—44. If a metallic wall member 4—43 is used, the pole pieces may be united thereto, in their properly aligned position, as by soldering, with a stable solder.

If the wall member 4—43 is of synthetic resin material, the two pole pieces may be secured thereto by a cement having a curing temperature of about 150° to 200° and which provides a stable union between the pole pieces and their supporting wall member under varying temperature and humidity conditions.

To reduce wear, the pole face regions 3—55 of the pole pieces may be coated, as by plating, with a hard material, such as chromium. If the two wall members 4—43, 4—44 are of metal, the surfaces of the pole pieces and of the wall members 4—43, 4—44, particularly those facing the guide channel, may be plated with a material, such as chromium, having high wear resistance so as to prevent wear of all surfaces along which the wire is guided and moves.

In the magnetic head shown in Figs. 18 and 19, the two wall members 4—43, 4—44 are of metal, and they are both united to each other and to the two pole pieces 3—51 held aligned between them, so that they constitute a rigid double pole-piece unit which provides effective protection to the thin pole pieces. The lower wall member 4—44 terminates at 44—5, as indicated in Figs. 18 and 19, so as to expose the rearwardly extending end portions of the pole-pieces 3—55 which have to be held in magnetic contact with the underlying end portion of the yoke member 3—52 when the double pole-piece unit is placed in position above the yoke member 3—52 of the transducer head structure. The yoke member 3—52 with the transducer coil are fixedly mounted, as by cementing, on a supporting wall member 4—46 which may be of molded synthetic resin material. The wall member 4—43 and the supporting wall member 4—46 are provided with open spaces 4—47 in which the coil 3—53 is located. Suitable recesses formed on the surface portions of the wall member on which the ends of the yoke member 3—52 are held serve to retain the yoke member in its position on the mounting wall member 4—46.

Suitable elastically compressible means, such as sheet elements 4—48, of synthetic rubber, such as neoprene, may be placed underneath the overlapping end portions of the magnetic yoke 3—52 and the overlying end portions of the pole pieces 3—51 for providing a biasing force which secures good magnetic contact engagement between them. The compressible biasing elements 4—48 are placed in suitable recesses formed in the mounting wall member 4—46.

This arrangement makes it possible to arrange the double pole-piece unit formed by the two wall members 4—43, 4—44 and the two pole pieces 3—51 united thereto as a detachable readily exchangeable unit which may be removed from its position on the supporting wall member 4—46, by loosening clamping screws 4—45 which hold them clamped in their operative position. To facilitate ready aligning of the detachable double pole-piece unit formed, the support wall member 4—46 may be provided with two upwardly projecting aligning pins 4—83 shaped to interfit with suitable aligning holes formed in the two wall members 4—43, 4—44. Instead of using separate clamping screws 4—45, the aligning pins may be used as clamping screws, for instance, by providing them with upwardly extended threaded ends on which the clamping nuts may be screwed for clamping the double pole-piece unit in its aligned position on the support member 4—46. Such combined arrangement of aligning pins and clamping means may be advantageously utilized in all constructions in which a double pole-piece unit is mounted in an aligned position on a supporting structure of the transducer head.

The two guide wall members 4—43, 4—44 arranged in the manner shown in Figs. 18 and 19 may thus be united to the two aligned pole pieces 3—51, 3—56 so as to form therewith a removable double pole-piece unit which completely protects the critical gap region of two pole pieces. Instead of uniting the two pole pieces 3—51 to the two wall members 4—43, 4—44 by soldering or cementing, they may be united to each other by a plurality of very thin watch screws, as indicated at 43—4.

When thin watch screws 43—4 are used for uniting the two wall members 4—43, 4—44 and the pole pieces 3—51 in their aligned position, the location of the watch screws is so chosen that all screws are located along the direction of the same magnetic flux field lines. In other words, the same magnetic flux field line should cross the location of the several screws extending through the pole piece. Thin rivets may be used in lieu of watch screws 43—4 for making double pole-piece units of this type. Such watch screws or rivets are also very desirable for securing alignment of the several elements of such double pole-piece units in their properly adjusted critical operating relation, even if the several elements are united to each other by solder or cement.

Where a magnetic head of extremely small dimensions is desired, the supporting wall member 4—46 may be omitted and the lower wall member 4—44 may be made co-extensive with the upper wall member 4—43, in which case the yoke member 3—52 with its coil 3—53 is held in its proper position by suitable recesses formed in such extended lower wall member. In such construction, the two pole pieces are united only to the upper wall member.

Alternatively, the supporting wall member 4—46 may be replaced by a wall section of the same thickness as the lower wall member 4—44 extending rearwardly therefrom, as if it were an extension thereof, such wall section being also provided with a projecting central portion extending to the right as seen in the figures to provide a support for the right-hand aligning pin 4—63.

Such compact magnetic transducer head may also be formed out of that shown in Figs. 13 to 17 by replacing the two thick wall members 3—43, 3—44 thereof with thin wall members, such as 4—43 of Figs. 18 and 19, arranged to hold therebetween the magnetic core combination formed of an exchangeably removable double pole-piece unit with the mounting ring 3—61 and a yoke member 3—52 with its coil 3—53 affixed to the lower wall member. To further increase the compactness, the guide channel 4—40 may be made with guide surface walls tapered outwardly only at the extreme periphery, the interior wall portions being parallel.

If a magnetic head of the type shown in Figs. 18 and 19 is to be used with A. C. biasing flux, the two wall members 4—43, 4—44 should be of a material which has high electrical resistance, such as ceramic or synthetic resin material, in order to reduce the eddy-current losses.

In Figs. 20 and 21 is shown a further form of a magnetic recorder-reproducer head of the type described in connection with Figs. 13 to 17, and 18, 19. It has two wall members 5—43, 5—44, provided with a channel structure 5—40 and a cavity 5—48 having mounted therein a magnetic core structure including two pole pieces 3—51 and a yoke member 3—52 with a transducer coil 3—53 mounted thereon, all generally arranged in the same manner as the corresponding elements of Figs. 13 to 17.

The two pole pieces 3—51 are shown united in their properly aligned positions to a substantially rigid supporting body formed of a ring member 5—61 and a ring segment 61—5 extending along the opposite flat sides of the two aligned pole pieces 3—51, in the same manner as the two wall members 4—43, 4—44 of Figs. 18 and 19 are united to their two pole pieces. The ring member 5—61 is similar to the mounting ring 3—61 of the double pole-piece unit of Figs. 26 to 30, except that it overlies the entire radial width of each of the two pole pieces 3—51 and extends outwardly beyond its outer edge so as to form, in conjunction with the similarly arranged and shaped segment 61—5 underlying the front region of the pole pieces 3—51, an outwardly tapering channel-shaped region 41—5 extending in front of the pole-face regions 3—55 of the pole pieces 3—51. The central region of the tapered elongated channel structure 5—40 of the two walls 5—43, 5—44 exposes the channel region 41—5 of the double pole-piece channel unit in such manner that the recording wire is guided toward and away from the two aligned pole-face channels of the pole faces 3—55 of the two pole pieces.

The pole-piece mounting ring 5—61 and the mounting segment 61—5 may be united to each other and to the two pole pieces 3—51 in any one of the various manners described herein in connection with the similar double pole-piece unit structures of Figs. 18 and 19. Thus, the ring 5—61 and segment 61—5 may be made of a non-magnetic metal of high electric resistivity and they may be united to each other and to the properly aligned assembled pole pieces 3—51 by soldering in a suitable jig as explained in connection with the similar elements of the previously described transducer heads.

As indicated in Figs. 20 and 21, the rear part of the mounting ring 5—61 has secured to its underside a complementary ring segment 61—6 similar to the ring segment 61—5 so as to form a mechanically balanced double pole-piece unit. The upwardly facing inner seating surface of the lower wall member 5—44 is shaped to hold in position, as by cementitious material, the yoke member 3—52 and its coil 3—53 and for seating in proper cooperative relation with respect thereto the balanced double pole-piece unit with its mounting ring structure 5—61 and the two ring segments 61—5, 61—6, in position on the lower wall member.

Two aligning pins 5—47 suitably affixed in the wall member 5—44 for cooperation with suitable aligning notches in the double pole-piece unit, serve to assure ready and proper alignment of the double pole-piece unit when placed in its position within the cavity on the lower wall member 5—44 so that the rear ends of the pole pieces 3—51 make magnetic contact with the underlying portions of the yoke 3—52, and its two pole faces 3—55 are exposed for proper operative engagement with an intermediate portion of a signal carrier filament impelled through the narrow inner track channel 5—42 extending on both sides and in alignment with the pole-face channels 3—57 forming the innermost, deepest part of the channel region 41—5 of the mounting ring elements 5—61, 61—5.

Obviously, the electromagnetically balanced magnetic transducer heads of Figs. 4 to 12 may be constructed in more compact form in accordance with the principles described above in connection with Figs. 19 to 21, by uniting the two balanced pole pieces 51 on which the transducer coils 53 have been placed, to one or two relatively thin but rigid wall members arranged to form also the guide channel structure.

This application is in part a continuation of application Serial No. 550,570, filed August 22, 1944, now abandoned.

The present invention is directly only to the features of the invention claimed herein and involving the special loop-type magnetic record transducing head in which the magnetic core, extending substantially completely on one side of filamentary magnetic record track, has pole portions formed of a single thickness of magnetic sheet metal of the order of thickness of the record track and provided with arcuate core edges constituting convex pole faces along which the record track is stably guided past the tiny non-magnetic gap separating the two pole portions. The features of invention disclosed herein involving a hum-bucking magnetic transducer head—having a loop-like magnetic core separated by at least one pair of non-magnetic gaps of substantially equal reluctance into a pair of magnetically-substantially-alike core paths with alike numbers of winding turns of each of said core paths so that any homogeneous stray magnetic or electric disturbance induces in the two core path and their windings magnetic and electric effects which substantially cancel each other—are claimed in the copending application Serial No. 687,047, filed July 30, 1946, as a continuation in part of applications Serial No. 454,688, filed August 13, 1942, now abandoned, and Serial No. 550,570, filed August 22, 1944, now abandoned. The features of invention disclosed herein involving a magnetic record transducing head having a loop-like core formed of two distinct core legs projecting in opposite directions from surrounding windings and held in operative position across a nonmagnetic transducing gap by a rigid mounting structure affixed to projecting leg portions, and from which mounting structure the gap-bordering pole portions of the core legs project into engagement with the record track, are claimed in the copending application Serial No. 688,738 filed August 6, 1946, as a continuation in part of application Serial No. 550,573 filed August 22, 1944.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

We claim:

1. In a magnetic record transducing apparatus for recording signals on or reproducing signals from a moving, flexible magnetic record track of filamentary width: an elongated magnetic record transducing head including a magnetic core for carrying electric signals corresponding to the magnetic records; said core having a convex arcuate edge of a length greatly exceeding the thickness of the core, and portions of said core extending along said arcuate edge constituting pole portions having an arcuate guide path extending lengthwise said arcuate edge; said pole portions being separated by a non-magnetic gap extending inwardly from said edge transverse to said guide path and being each of a single thickness of magnetic sheet metal; said arcuate guide path forming, except for the gap, a substantially continuous surface extending smoothly along the path of the record track in both directions from the non-magnetic gap a distance sufficient to provide a smooth, convex guide surface for the magnetic track so that forces applied to the moving record track cause it to be flexed against the convex guide surface and to be guided toward and away from the non-magnetic gap along a substantial length of the convex arcuate pole portions; said pole portions being of the same order of thickness as the record track and less than about 20 mils; said core extending substantially completely on one side of the arcuate edge.

2. In a magnetic record transducing apparatus for recording signals on or reproducing signals from a reelable, moving, thin, flexible magnetic record filament of generally circular cross-section: a transducing head including electrical coil windings and a magnetic core for magnetically coupling said filament of magnetic material to said windings; said core having an arcuate convex edge of a length greatly exceeding the thickness of the core, and portions of said core extending along said arcuate edge constituting two pole portions having an arcuate groove extending lengthwise said arcuate edge; each pole portion being in the form of a single lamina of permeable ferromagnetic material having a substantially rectangular cross-section of a thickness of the order of thickness of said filament of magnetic material; said pole portions being supported in opposed relation to provide between their ends a non-magnetic gap extending inwardly from said arcuate edge and through which gap the record filament moving through said groove has to pass; and means for guiding the record filament in a position in which it is freely removable from said groove, and in which it is subjected to biasing forces causing a substantial length of the moving filament to be flexed into engagement with the grooved convex edge portions of the core on both sides of said gap.

3. In a magnetic record transducing apparatus for recording signals on or reproducing signals from a reelable, moving, flexible, elongated, filamentary thin magnetic record track of generally circular cross-section: a magnetic record transducing head including a magnetic core for carrying electric signals corresponding to the magnetic record; said core having a convex arcuate edge of a length greatly exceeding the thickness of the core, and portions of said core extending along said arcuate edge constituting pole portions having an arcuate groove extending lengthwise said arcuate edge; said pole portions being separated by a non-magnetic gap extending inwardly from said edge transverse to said groove and being each of a single thickness of magnetic sheet metal; said arcuate groove forming, except for the gap, a substantially continuous surface extending smoothly along the path of the record track in both directions from the non-magnetic gap a distance sufficient to provide a smooth, convex guide surface for the magnetic track so that tension applied to the moving record track causes it to be flexed against the convex guides surface and to be guided toward and away from the non-magnetic gap along a substantial length of the convex arcuate pole portions; said pole portions being of the same order of thickness as the record track; said core extending substantially completely on one side of the arcuate edge.

4. A magnetic record transducing apparatus as defined by claim 3, characterized by the fact that all elements of the core are made of a single thickness of a magnetic sheet metal.

5. A magnetic record transducing apparatus as defined by claim 3, characterized by the fact that the deep portion of the arcuate groove is of substantially semi-circular cross-section.

6. A magnetic record transducing apparatus as defined by claim 3, characterized by the fact that the deep portion of the arcuate groove is of substantially semi-circular cross-section, and that the thickness of the pole portions is about twenty mils or less.

7. A magnetic record transducing apparatus as defined by claim 6, characterized by the fact that the thickness of all elements of the core is about twenty mils or less.

8. A magnetic record transducing apparatus as defined by claim 7, characterized by the fact that the deep portion of the arcuate groove is of semi-circular cross-section.

SEMI JOSEPH BEGUN.
MARVIN D. TEMPLE.

REFERENCES CITED

The following references are of record in the file of this patent:

UNITED STATES PATENTS

| Number | Name | Date |
|---|---|---|
| 661,619 | Poulsen | Nov. 13, 1900 |
| 1,867,179 | Schroeter | July 12, 1932 |
| 2,351,007 | Camras | June 13, 1944 |